United States Patent [19]

Steele

[11] 4,053,145
[45] Oct. 11, 1977

[54] CUTTING TORCH GUIDE

[76] Inventor: Richard J. Steele, 2202 Harwell, Houston, Tex. 77026

[21] Appl. No.: 557,809

[22] Filed: Mar. 12, 1975

[51] Int. Cl.² .............. B23K 7/04; B23K 7/10
[52] U.S. Cl. ................... 266/58; 33/21 C; 266/54; 266/56; 266/62; 266/70
[58] Field of Search ............ 33/21 C; 148/9.6; 266/23 R, 23 HH, 23 L, 23 M, 23 N, 54, 56, 62, 63, 72, 58, 70

[56] References Cited

U.S. PATENT DOCUMENTS

| 1,991,117 | 2/1935 | Porteous et al. | 33/21 C |
| 2,659,972 | 11/1953 | Norris | 33/21 C |
| 2,725,634 | 12/1955 | Hopper | 33/21 C |
| 2,791,031 | 5/1957 | Uskert | 33/21 C |
| 3,035,946 | 5/1962 | Kleine | 148/9 |
| 3,819,163 | 6/1974 | Stunkard | 266/23 NN |

Primary Examiner—Gerald A. Dost
Assistant Examiner—Paul A. Bell
Attorney, Agent, or Firm—Ranseler O. Wyatt

[57] ABSTRACT

A guide for a cutting torch providing means for effecting circular cutouts in large vessels or large diameter pipe without the need of a lay-out other than fixing a working point and providing multiple adjustments so that cuts may be made of the desired diameter as well as having the desired bevel.

6 Claims, 5 Drawing Figures

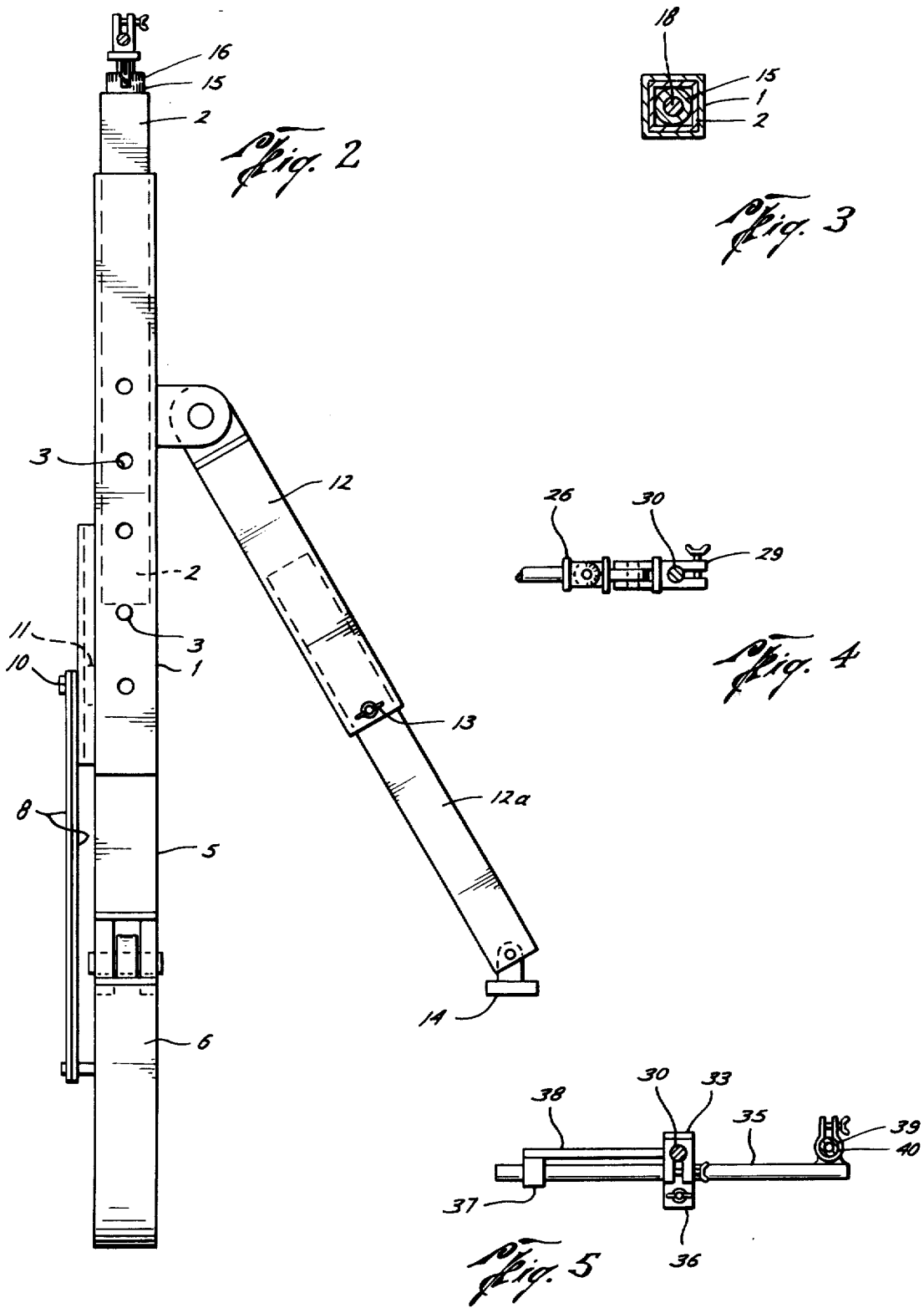

4,053,145

CUTTING TORCH GUIDE

BACKGROUND OF THE INVENTION

In joining pipe to a vessel, or to larger pipe, at various angles, it is essential that the cut be made with sufficient accuracy to permit an easy weld with a minimum amount of time involved. To do this, it is common practice to have a lay-out drawn for the work, giving the cutting torch operator the dimensions and andgles of the various cuts necessary. Such lay-outs require considerable time in preparation, and in many instances, torch operators have difficulty following the instructions of the lay-out, resulting in inaccurate cuts, requiring fill-in of excessive cuts or recutting those that are undercut. It is an object of this invention to provide a device that will permit such cuts to be made without the need of such a lay-out, and that eliminates the possibility of over-cuts or under-cuts.

SUMMARY OF THE INVENTION

A cutting torch guide having means for releasably anchoring the device to a workpiece, and having multiple adjustments so that the proper circumferential movement of the cutting torch may be effected at the proper angle for the desired bevel. A vertically movable torch holder, a workpiece contacting member and a cutting torch holder rotatably mounted on said contacting member free to move vertically as it rotates, following the contours of the work piece, by the manual rotation of said torch holder shaft and, with the aid of the counterweight, vertically adjusting the holder as the torch is rotated.

BRIEF DESCRIPTION OF THE DRAWINGS

FIG. 2 is a side elevational view.

FIG. 3 is an end, cross sectional view, taken on the line 3—3 of FIG. 1.

FIG. 4 is a fragmentary, enlarged view of the vertical holder-horizontal bar hinge, being an end view taken on the line 4—4 of FIG. 1, and FIG. 5 is an enlarged cross sectional fragmentary view illustrating the torch holder taken on the line 5—5 of FIG. 1.

DESCRIPTION OF THE PREFERRED EMBODIMENT

Figure 1:
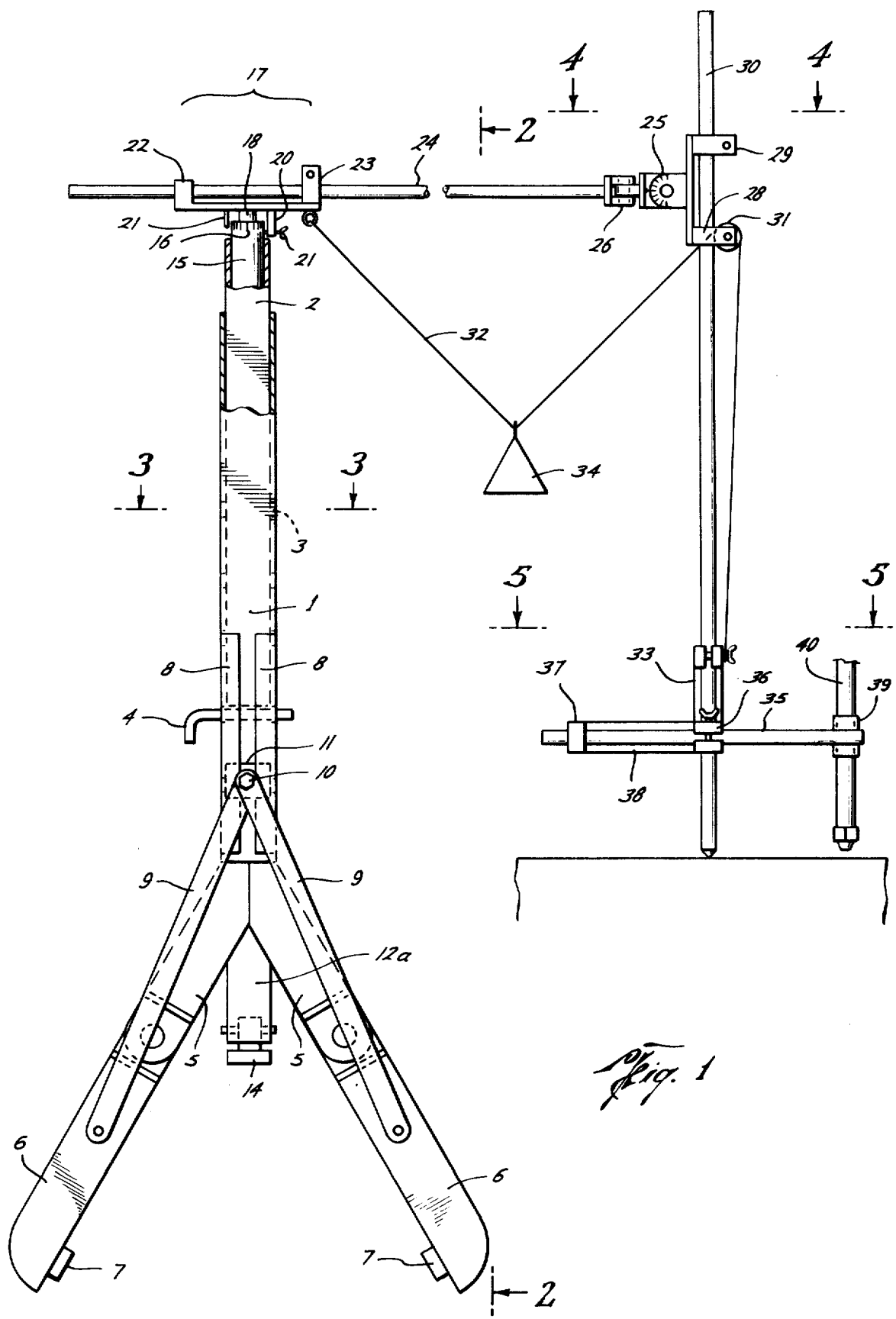
FIG. 1 is a front elevational view, partially in cross section.

In the drawings, the numeral 1 designates the outer housing in which the inner housing 2 is telescopically mounted and a plurality of pairs of aligned passageways 3, 3 in the housing 1, receive the pin 4, upon which the lower end of the housing 2 rests, to adjust the height of the device, and to maintain the housings 1, 2 in the desired position with relation to each other.

Two fixed legs 5, 5 extend outwardly and downwardly from the housing 1 and have the adjustable legs 6, 6 hinged adjacent their lower ends. Laterally extended plates 8, 8, separated to provide a slot therebetween, are longitudinally mounted on the housing 1 and the braces 9, 9 are pivotally mounted at one end on the respective legs 6, 6 and pivotally mounted at the other ends on the bolt 10 which is secured into the back up block 11 to provide means for locking the legs 6, 6 in the desired position. A third leg 12 is pivotally mounted on the housing 1 and extends rearwardly, and has a telescoping section 12a which is provided with a set screw 13 to lock the section 12a in the desired position. A magnet 14 is pivotally mounted on the extended end of the section 12a.

Mounted at the upper end of the housing 2 is a tubular shaft 15 on which the protractor 16 is mounted, the shaft 15 being fixed in the housing 2 and a horizontal shaft holder 17 has a vertical shaft 18 extending therefrom and rotatably mounted in the shaft 15. The holder 17 has the horizontal base member 1 from which a lug 20 depends and through which the set screw 21 extends to lock the holder 17 in the desired position. A finger 21 also depends from the base member 19 to be used with the protractor in setting the position of the holder 17. A tubular upstanding member 22, at one end of the holder 17, is aligned with the clamp 23 at the other end of the holder 17, and the horizontal shaft 24 extends through the members 22, 23.

On one end of the shaft 24 is the pivotally mounted vertical shaft holder 25 and a protractor is impressed on one vertical face of the holder 25 and a similar protractor, or graduation marks, is formed in the top face of the hinged member 26. The vertical shaft holder 25, having the tubular member 28 and clamp member 29, receives the vertical shaft 30, and a pulley 31 is also mounted on the holder 25 on which the cable 32 is mounted. A holder 33 is freely vertically movable on the shaft 30, and one end of the cable 32 is connected thereto and the other end of the cable 32 is connected to the holder 17 and a counterweight 34 is loosely mounted on the cable 32 between the holder 17 and the holder 25. The lower end of the shaft 30 is pointed to bear against the work, and the torch holder shaft 35 extends horizontally through a clamp member 36 on the holder 33. The holder 33 has a horizontal stabilizing member 38 extending laterally therefrom, with a tubular member 37 at its extended end through which the shaft 35 extends, and on the opposite end of the torch holder 39 in which a cutting torch 40 is mounted.

In use the device is mounted on a vessel or pipe, the legs 6, 6 being adjusted to the contour of the work, and the legs 12 being adjusted to support the housing 1, 2 at the desired vertical position. The nut 21 is released, and the holder 17 turned to the desired position, and then locked in place by tightening the nut 21, and the holder 25 pivoted on the hinge 26 to position the shaft 30 over the area to be cut and the shaft 30 is then moved onto the work until the pointed end contacts the center of the area to be cut. The counter weight 34 will assist in moving the holder 33 vertically on the shaft 30 as the work progresses, and the torch is moved to and maintained the desired distance from the surface of the area to be cut. The shaft 35 is moved horizontally to place the torch at the desired cutting point, and then clamped in place. The leg 3 and the hinge 25 will permit the shaft 30 to be at the angle of the predetermined cut. The stabilizer 38 will assist in balancing the weight of the torch 40, so that the operator may easily move the holder 38 around the shaft 30, following the contour of the work. The leg 3, by its position, determines the bevel of the cut. When the cut is completed, the machine may readily be removed and set up for another cut.

What I claim is:

1. A cutting torch guide having telescoping vertical housings, means on one of said housings for anchoring said housing to the work, and means on the other housing, horizontally adjustable, and having a shaft holder on one end, vertically transverse and horizontally transverse pivotal adjustment means on said shaft holder, a vertical shaft in said shaft holder, and a horizontally adjustable torch holding shaft mounted on said vertical shaft and freely movable vertically thereon and a cutting torch holder on one end of said torch holding shaft.

2. The device defined in claim 1 wherein one of said housings is a fixed housing and a third leg is pivotally mounted on said fixed housing having two telescoping sections, with means for locking the sections in a selected position to effect the cut at the bevel desired.

3. The device defined in claim 1 wherein said shaft holder has a transverse and a vertical pivotal connection, and indicia thereon providing a protractor for each direction of pivot.

4. The device defined in claim 1 wherein said means for holding said housings on the work consists of legs mounted on said fixed housing, said legs being sectional, the lower portion thereof being pivotally mounted to the upper portion and means on said fixed housing for locking the pivotal portion of said legs in the selected position, relative to the fixed portion.

5. The device defined in claim 1 wherein the horizontal shaft holder may be locked in the desired radial position relative to the housings, and said vertical shaft holder positioned at the desired transverse angle relative to the horizontal shaft, and the said torch holding shaft moved horizontally in said torch holding shaft holder to the desired position relative to said vertical shaft and locked in position thereon, and the torch holding shaft rotated on said vertical shaft to effect a cut at the desired angle.

6. The device defined in claim 1 wherein said pivotally mounted shaft holder has a transverse and a vertical pivot, respectively, each pivot having indicia for a protractor.

* * * * *